Aug. 31, 1943.                B. R. HENDERSON                2,328,340
                                CONTROL APPARATUS
                              Filed Oct. 24, 1940           6 Sheets-Sheet 1
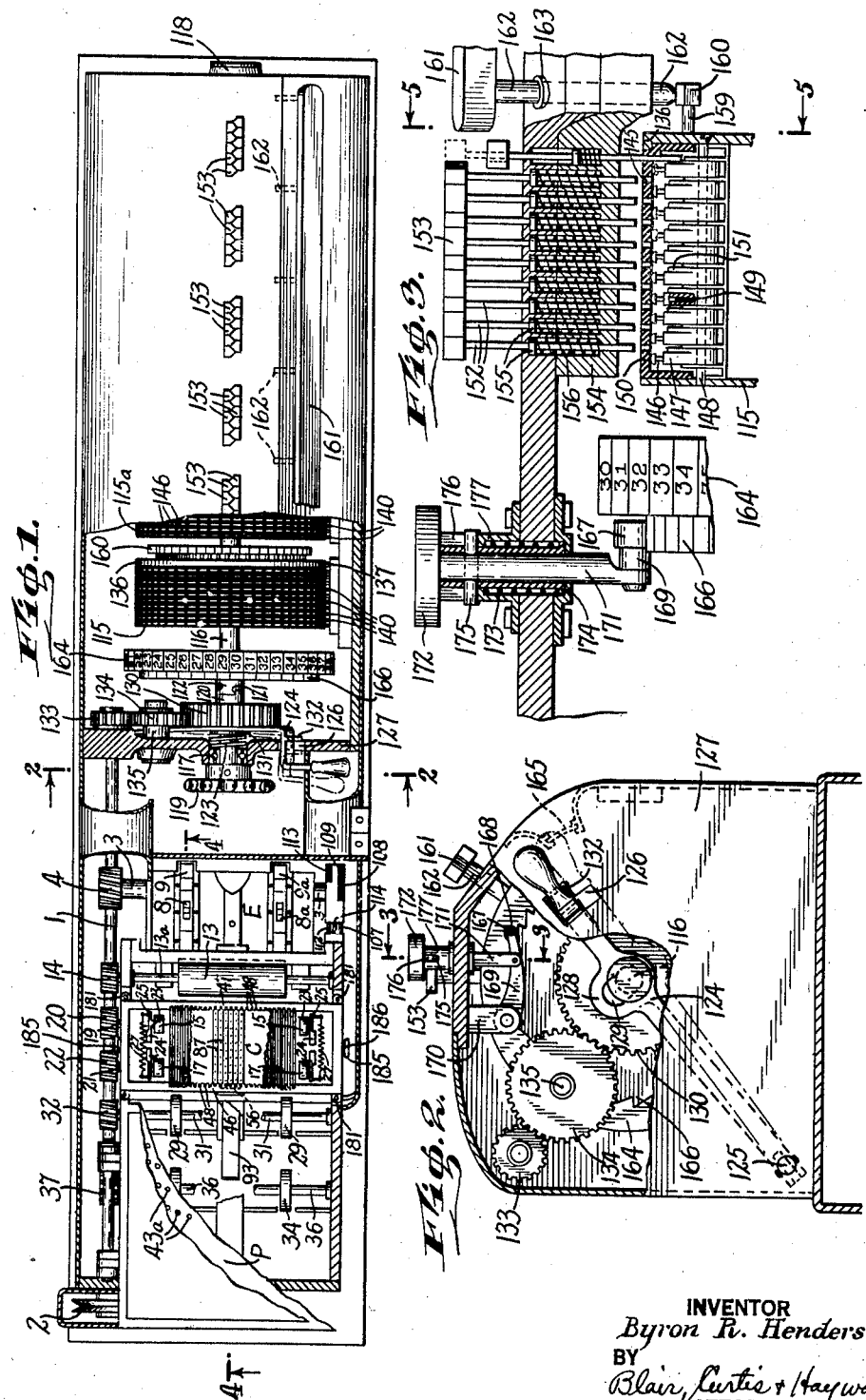
INVENTOR
Byron R. Henderson
BY
Blair, Curtis & Hayward
ATTORNEYS.

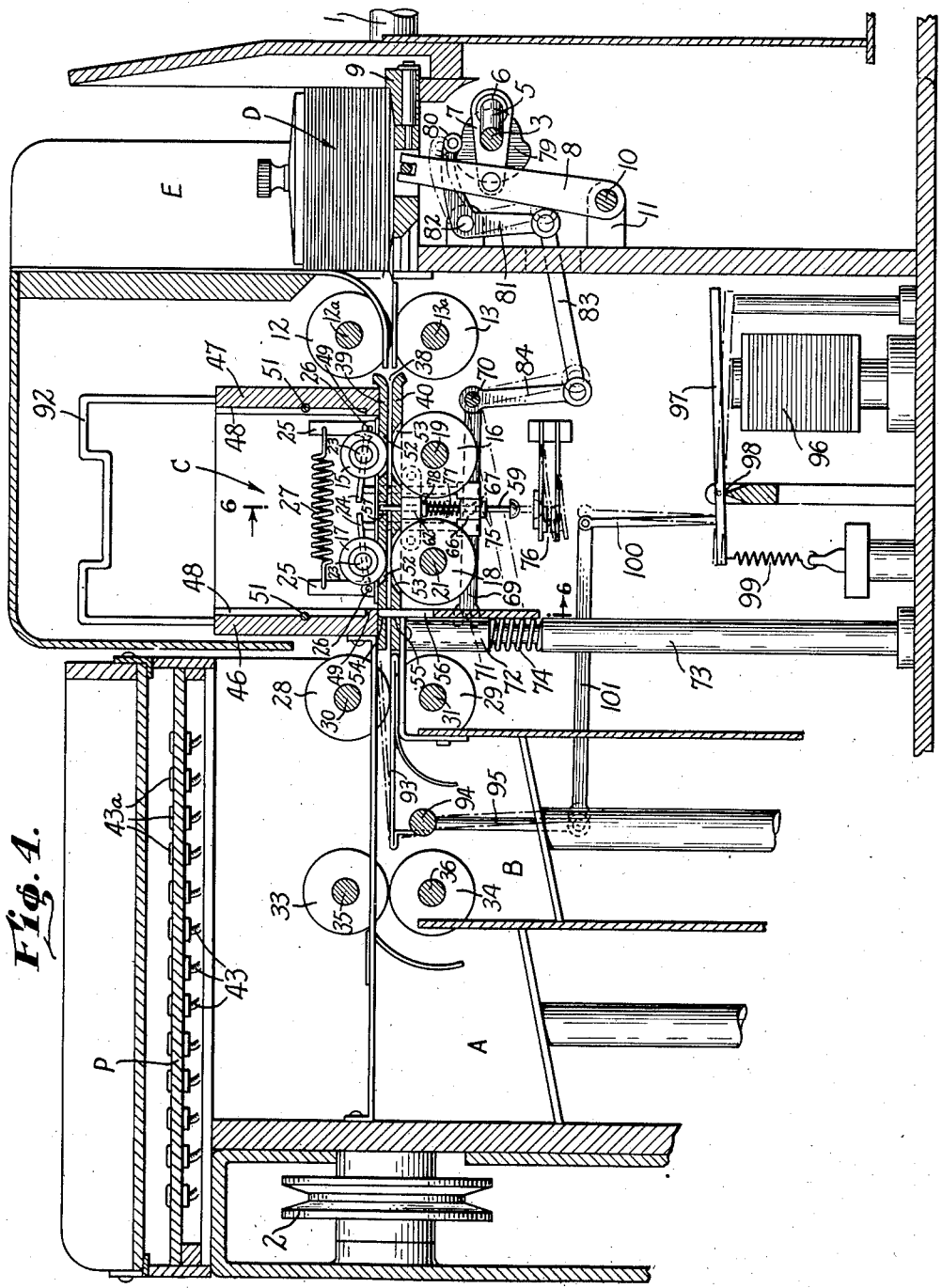

Aug. 31, 1943. B. R. HENDERSON 2,328,340
CONTROL APPARATUS
Filed Oct. 24, 1940 6 Sheets-Sheet 3
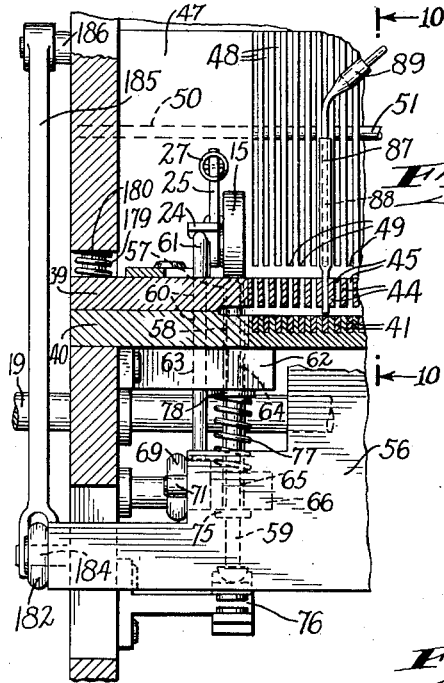
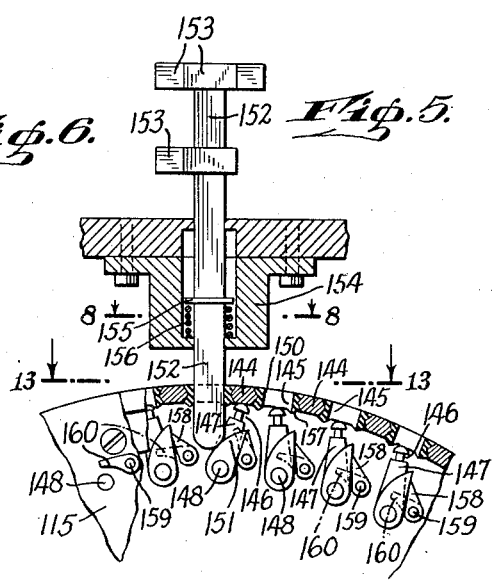
INVENTOR
Byron R. Henderson
BY
Blair, Curtis & Hayward
ATTORNEYS
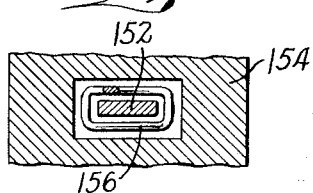

Aug. 31, 1943.　　　B. R. HENDERSON　　　2,328,340
CONTROL APPARATUS
Filed Oct. 24, 1940　　　6 Sheets-Sheet 4
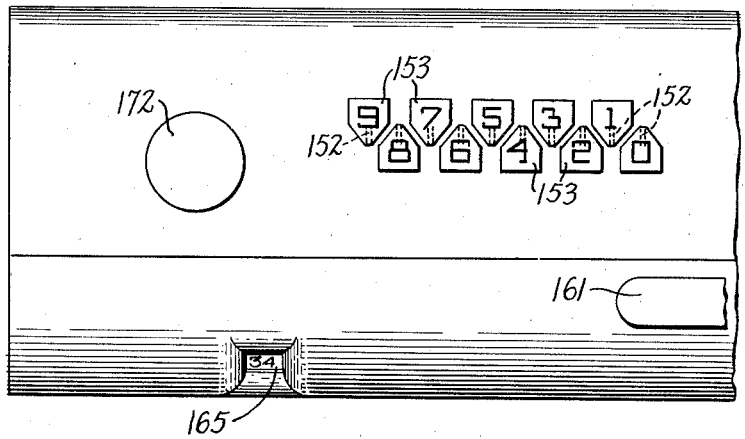
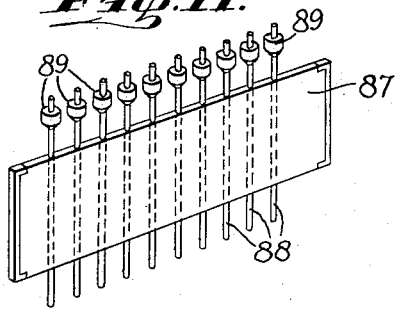
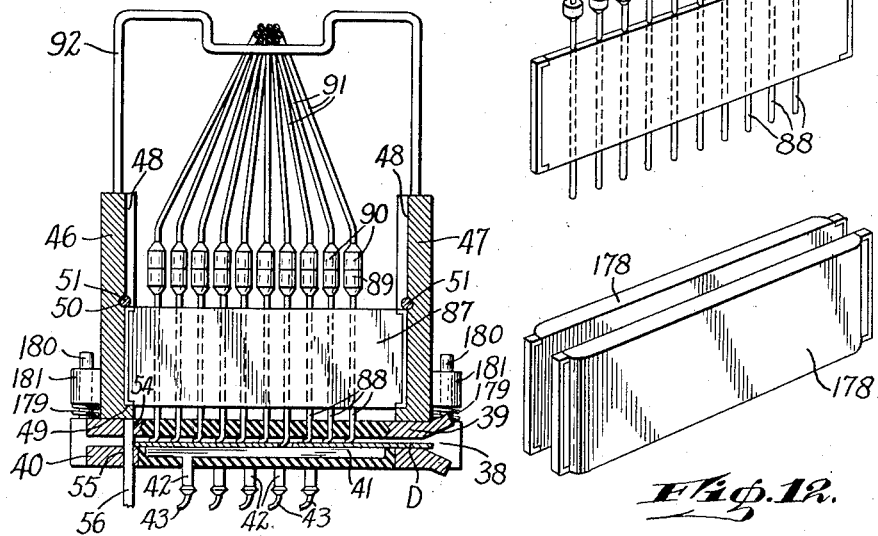
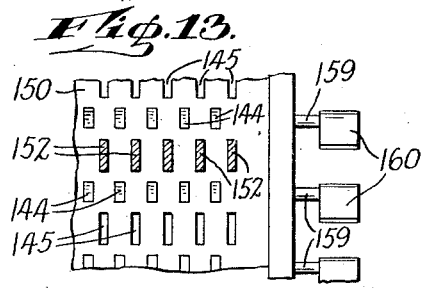
INVENTOR
Byron R. Henderson
BY
Blair, Curtis + Hayward
ATTORNEYS Aug. 31, 1943.  B. R. HENDERSON  2,328,340
CONTROL APPARATUS
Filed Oct. 24, 1940  6 Sheets-Sheet 5
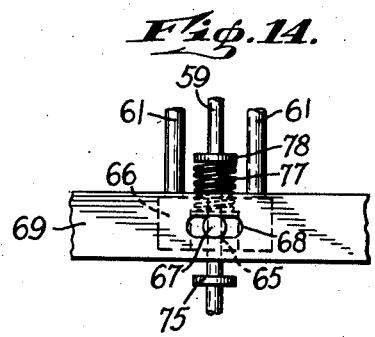
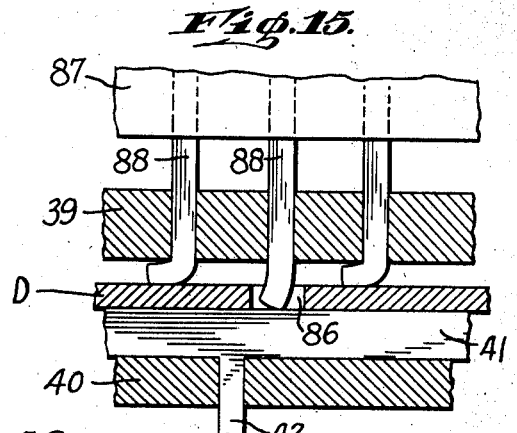
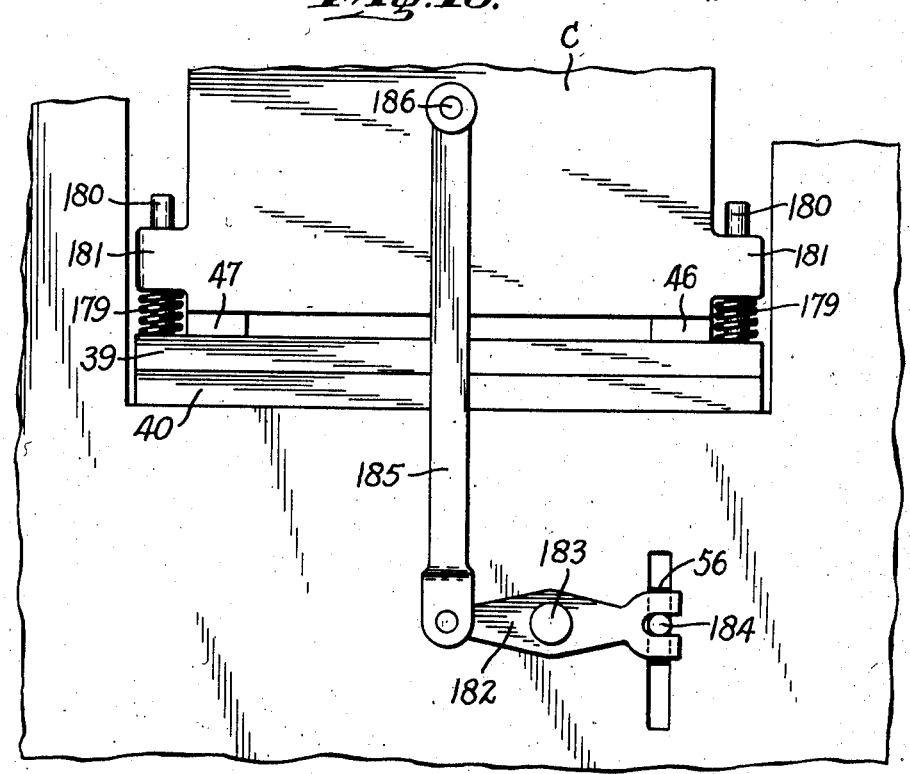
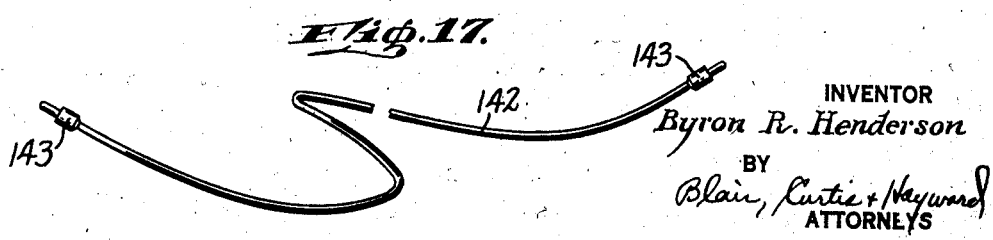
INVENTOR
Byron R. Henderson
BY
Blair, Curtis & Hayward
ATTORNEYS

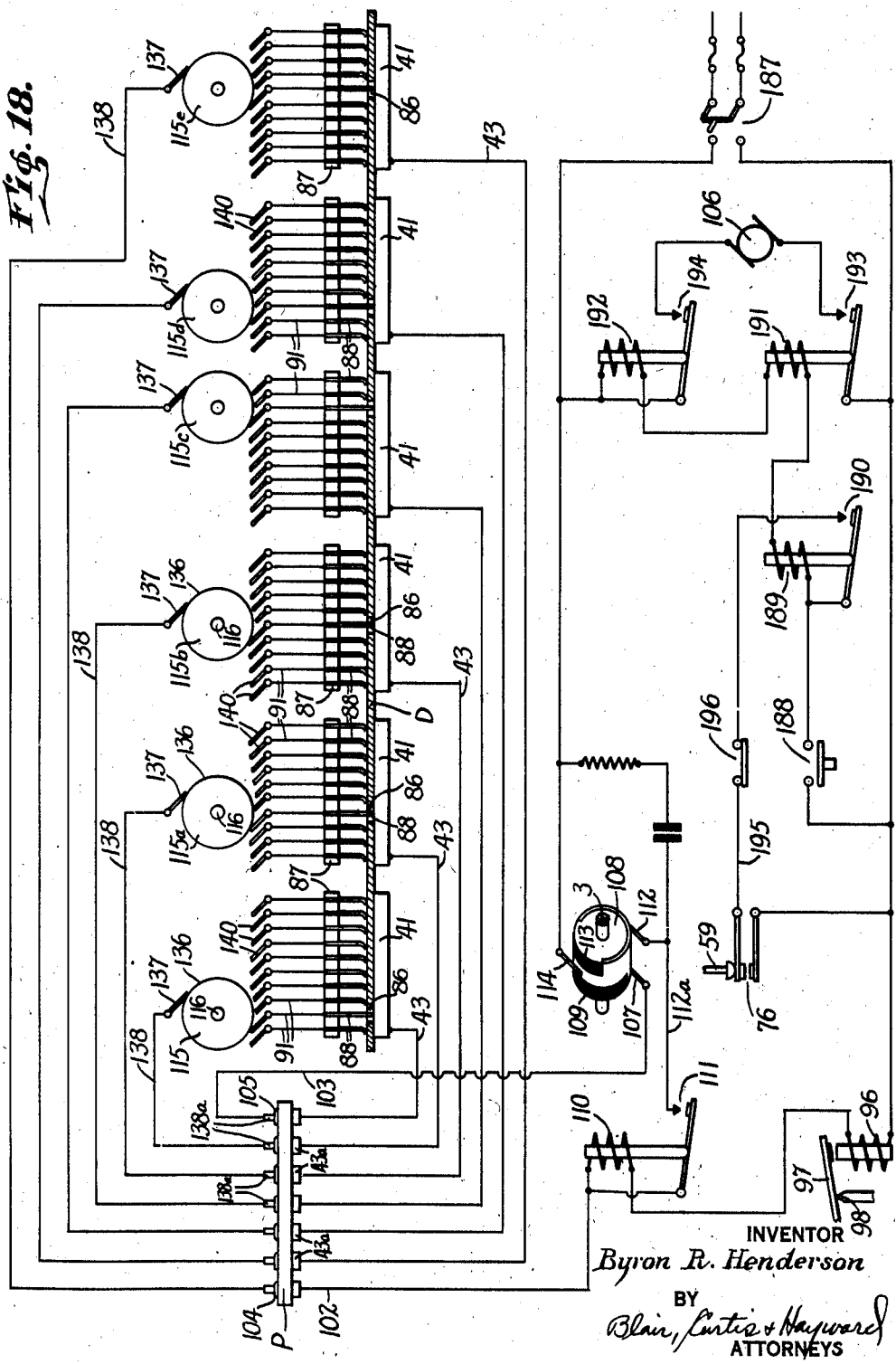

Patented Aug. 31, 1943

2,328,340

UNITED STATES PATENT OFFICE 2,328,340

CONTROL APPARATUS

Byron R. Henderson, East Orange, N. J.

Application October 24, 1940, Serial No. 362,578

19 Claims. (Cl. 209—110)

The present invention relates to an improvement in devices employing perforated cards or the like as control instrumentalities in connection with machines of the type including tabulators, selectors, sorters and collators commonly used in identifying, selecting, segregating or otherwise employing punched, or perforated cards or records.

Known types of these machines present certain limitations well illustrated by the sorter when used to select and segregate one or more perforated record cards from a file consisting, in many cases, of thousands of cards.

Assume that such a file comprises 10,000 cards each representing an automobile identified by a registration number of up to six digits and that these cards are normally arranged in main groups according to geographically defined sales districts, in sub-groups according to dealer territories within said districts, and in serial number sequence in each dealer territory sub-group. All indicia of these determinative grouping features as well as said registration numbers and other data appear on the cards in the form of perforations in patterns or arrangements according to well known systems.

It is now desired, for example, to select and separate from said 10,000 cards a plurality thereof, as forty, whose numeral indicia in the form of perforation patterns represent forty different registration numbers of up to six significant digits. To accommodate indicia of numbers of this order, the cards provide six columns of spaces for perforations representing digits from 0–9 inclusive, one column for each digit. To find said forty cards with the aid of known mechanical devices the entire file of 10,000 cards must first be rearranged to bring all the registration numbers (represented by perforations) into sequence. This is done by passing said 10,000 cards through a sorter six times, once for each of said digit columns, begining with units. The desired forty cards can now be removed by hand from the stack of 10,000.

Where the record cards are normally arranged in the file according to markings carried on each card face and indicating different group fields, as class, region, district, serial number, motor number, registration number, etc., it is necessary to restore the sorted 10,000 cards to normal file arrangement. In a typical case involving the group fields above stated, the 10,000 cards must be run through the sorter sixteen times starting with a sort on the units column of the serial number field to restore them to their normal order in the file. Thus, it appears that in a fairly typical case, 10,000 cards must be run through the sorter twenty-two times merely to select and remove forty designated cards and thereafter to restore the cards to their normal file order.

One object of the present invention has been to provide apparatus which when embodied in a sorting machine or the like, for example, enables such a machine, during a single run or pass of cards, whether grouped or scrambled, or sorted or unsorted, to automatically select, segregate and/or usefully employ a plurality of predetermined cards, each on the basis of one or more perforations therein representing a different number, or having other identification or distinguishing indicia in terms of perforations therein disposed in one or more columns.

As applied to an electrically operated record card sorter for example, one embodiment of my invention as shown in the appended drawings includes card guiding or actuating instrumentalities selectively operated by the making or breaking of a sensing circuit through shunts interposed therein and controlled in part by the cards and in part by preconditionable switches.

For this purpose, the record cards ordinarily of nonconductive material, have spaces representing the digits 0–9 arranged in one or more rows or columns of ten spaces each. The sensing circuit includes one or more sets of ten shunts each. Each set of shunts is arranged to cooperate with one of the rows or columns of digits employed in making the card record upon which the sorting is based. Digit spaces in one or more of said columns are rendered effective, as by perforations therein which form a record pattern, to permit the passage of electric current and, to that extent, to condition a shunt in one or more of the corresponding sets of shunts to energize the sensing circuit. If more than one set of shunts is used, as where the sort is based on a record pattern involving more than one digit column, said sets are connected in series.

For sensing, the record card is brought to a sensing station where all the spaces of each said digit column thereof are simultaneously in position to cooperate with the shunts of a corresponding set of shunts. Closure of the sensing circuit through one or more of said shunts in one or more of said sets of shunts, partly conditioned by one or more perforations in one or more digit columns of the record card, is completed by switches which are selectively preconditioned for that purpose.

To accommodate cards wherein the record pattern to be sensed involves more than one digit column, said switches are mounted on a multiple carrier which provides a carrier drum for each such column of digits. The switches on each drum are arranged in one or more separately operative and angularly spaced sets of ten switches each which cooperate with one of said sets of shunts. Rotation of the carrier brings the switches of each of said sets on a drum simultaneously into and simultaneously out of operative relation to the set of shunts of the corresponding column of the record card at the sensing station. Where the drum carries a plurality of angularly spaced sets of switches, said rotation brings one after another of said sets into and out of operative relation to said set of shunts.

Where the carrier has more than one drum, all are rotated together. Thus, all the switches disposed in the same angular relation on said several drums are brought simultaneously into operative relation to their respective shunts when said switches reach sensing position during rotation of the carrier.

One form of apparatus embodying my invention is described in the following specification and shown in the appended drawings, wherein—

Figure 1 is a plan view with portions broken away and portions shown in section;

Figure 2, a transverse vertical section on the line 2—2 of Figure 1;

Figure 3, an enlarged fragmentary view in longitudinal vertical section on the line 3—3 of Figure 2;

Figure 4, an enlarged longitudinal vertical section on the line 4—4 of Figure 1;

Figure 5, an enlarged fragmentary view in transverse vertical section on the line 5—5 of Figure 3;

Figure 6, an enlarged fragmentary view in transverse vertical section on the line 6—6 of Figure 4;

Figure 7, a fragmentary view of a perforated record card;

Figure 8, a fragmentary view in section on the line 8—8 of Figure 5;

Figure 9, an enlarged and fragmentary plan view of a top portion of the casing and exposed operating devices;

Figure 10, an enlarged view in vertical section on the line 10—10 of Figure 6;

Figure 11, a view in perspective of a contact or terminal carrier bar;

Figure 12, a view in perspective of a pair of retaining bars;

Figure 13, a fragmentary view in section on the line 13—13 of Figure 5;

Figure 14, a fragmentary detail showing circuit control plunger in circuit closing position;

Figure 15, an enlarged detail showing in exaggerated degree the relative positions and conditions of the sensing contact terminals during sensing;

Figure 16, an enlarged fragmentary detail showing devices for raising and lowering the sensing contact terminals;

Figure 17, a form of wire or conductor connecting portions of the circuit; and

Figure 18, a circuit diagram.

Referring to the drawings, my invention is there shown as embodied in an electrically operated sorter of the type wherein perforated record cards, after passing singly through a sensing and circuit operating zone, are delivered into a "wanted" compartment if the circuit is completed through the card perforations, or into a "rejected" compartment if the circuit is not completed, depending on the perforation pattern presented by each of said cards. For this purpose wall portions of the machine, Figure 4, are arranged to form a "reject" compartment at A, a "wanted" compartment at B, and a sensing zone at C. In operation, perforated cards, as D, Figure 7, are stacked in a hopper E and fed singly from the bottom of the stack to and through zone C by suitable card handling mechanism including pickers, for example as disclosed in U. S. Patents Nos. 1,476,161, 1,909,576 and 2,189,024 or appropriate modifications thereof, and other devices to be described.

*Card feeding*

As shown in Figures 1 and 4, various mechanically operating parts of the machine, as the card picker above referred to and suitable card feeding means, as rollers, are actuated in a well known manner from a main shaft 1 driven by suitable means, as a motor 106, Figure 18, through a sheave 2. Thus, a picker driving cross-shaft 3 is actuated by a main shaft 1 through a worm gear 4, said cross-shaft including a crank arm 5 and a crank pin 6. A link 7 connects crank pin 6 with a lever 8, the bifurcated upper end of which engages and actuates a card picker or pusher 9 in a well known manner to feed cards D out of hopper E. Lever 8 is fixed to one end of a shaft 10 journaled in brackets 11, the other end carrying a similar lever 8a, Figure 1, which actuates another card picker 9a operating in unison with the first.

Cards fed from hopper E by the devices described are engaged and advanced into the sensing or analyzing zone C, by feed rollers 12 on shaft 12a, and 13 on shaft 13a, the latter being driven from a worm gear 14, on main shaft 1, Figure 4.

In the sensing zone C, the cards are engaged and advanced by sets of rollers, the set at the inlet end including the upper idler rollers 15 and lower driven rollers 16, and the set at the discharge end including the upper idler rollers 17 and the lower driven rollers 18. The lower rollers 16 are on shaft 19 driven by worm gear 20, Figure 1; lower rollers 18 are on shaft 21 driven by worm gear 22; and both sets of lower rollers have smooth peripheral surfaces, as of polished metal.

The upper idler rollers 15 and 17 are mounted on studs 23 extending inwardly from the horizontal arms 24 of bell crank levers 25 pivoted at 26. Tension springs 27 yieldingly urge the vertical arms of levers 25 toward each other and thus normally bias the idlers on upper rollers 15 and 17 toward their respective cooperating driven lower rollers to maintain feeding pressure on the cards except under conditions hereinafter to be described.

After being analyzed or "sensed" in zone C, the cards are discharged by the rollers therein. In the case of a sorter or the like "wanted" cards are directed into one or more compartments, as B by means hereinafter to be described and "rejected" cards into compartment A. In the latter case, they engage and are advanced past compartment B by sets of feed rollers, including upper rollers 28 and cooperating lower driven rollers 29, said upper rollers being mounted on a shaft 30 and said lower rollers being on shaft 31 driven by worm gear 32. Another set of feed rollers for delivering the "rejects" into compartment A includes upper rollers 33 and cooperating driven rollers 34, said upper rollers being mounted on a shaft 35 and said lower rollers on a shaft 36 driven by worm gear 37. It will be understood that the ends of shafts 12a, 30 and 35, carrying the several sets of upper or idler rollers, except those in zone C, will be journaled with a slight vertical play to insure even feeding of the cards.

Sensing mechanism

As shown more clearly in Figures 4, 6 and 10, cards D fed to the "sensing zone" or operating position from the stack in hopper E enter a sensing box having a passageway formed between an upper plate 39 and a lower plate 40 and having an inlet opening 38. The lower plate supports a plurality of transversely arranged poles in the form of contact strips or terminals 41 preferably of conductive metal embedded in suitable insulating material, as Bakelite or equivalent, and with their upper edges exposed in said passageway. End portions of lugs 42 of said strips 41 extend through the insulating material and provide means for connecting said strips with wire conductors 43. Lugs on adjacently placed strips are disposed at different places along the length of their respective strips, Figure 10, to facilitate a staggered arrangement of connections for convenience in wiring. In general there will be as many strips or terminals 41 as there are vertical columns representing orders of numbers on the perforated record card, one form having eighty such columns being shown at D, Figure 7.

The upper plate 39 provides a series of parallel transversely arranged spaced strips 44 of insulating material, as Bakelite, forming between them a plurality of parallel slots 45, Figure 6, each of which opens directly opposite and over a contact strip 41.

A sensing box or housing extending above upper plate 39 and enclosing the above described slotted portion thereof provides spaced walls 46 and 47, Figure 10, having vertical grooves 48 aligned with corresponding transverse slots 45 in the upper plate 39 and opening at the top edges of said walls and terminating short of the bottom edges thereof to form horizontal shoulders 49. A hole 50 extending longitudinally through each of said walls 46 and 47 accommodates a lock rod 51 portions of which extend into and across portions of the grooves 48 when the rods are slid endwise into locking position in said holes 50.

As shown in Figure 4, openings 52 in upper plate 39 lie opposite openings 53 in lower plate 40. Peripheral portions of upper rollers 15 and 17 extend into said openings 52 and those of lower rollers 16 and 18 extend into said openings 53 to engage and feed a card in the passageway between said upper and lower plates.

Plate 39 also has adjacent its discharge edge longitudinally extending recesses 54 opposite like shaped holes 55 through lower plate 40, said holes and said recesses being positioned and aligned to receive upper end portions of a card stop plunger or gate 56 actuated across the card passageway in a manner and for a purpose to be described.

Feed arresting controls

Plates 39 and 40 also have vertical holes 60 to receive and guide the upper ends of plungers 61 which engage the under side of and actuate the horizontal arms 24 of the several bell crank levers 25 supporting the upper rollers 15 and 17 respectively which are normally biased toward the card passageway by the springs 27.

A fixed block 62, Figure 6, provides vertical guide holes 63 for said roller controlling plungers 61 and a vertical guide hole 64 for a safety switch control plunger 59, the stem or shank of which also slides through a guide hole 65 in a block 66 pivotally supported on an arm 69 by a laterally extending lug 67 engaging a slot 68 in said arm 69, Figure 14, one end of which is secured to shaft 70. The other or free end of arm 69 is bifurcated and engages a lug 71 on card stop plunger or gate 56 which is secured to a collar 72 slidable vertically on a post 73 and biased upwardly by a compression spring 74.

It will be understood that various of the parts above described are so arranged and their operation so timed that when a card reaches sensing position in the sensing zone, stop or gate 56 is moved upwardly by spring 74 into card stopping position carrying with it the free end of arm 69. The same movement of said arm 69 raises the plungers 61, thereby tilting the ends of arms 24 upwardly and lifting upper rollers 15 and 17 out of engagement with the card which momentarily remains stationary in sensing position. In effecting the next advance of the card being sensed, stop 56 is retracted against spring 74 by the positive downward swing of the free end of arm 69 which also retracts plungers 61 thus permitting rollers 15 and 17 to return to card engaging and feeding position.

Upper plate 39 also has a hole 57 coaxial with a hole 58 through lower plate 40 to receive and freely pass, under certain conditions, an upper end portion of the stem of said safety switch controlling plunger 59, Figure 6, biased upwardly by spring 77 bearing against collar 78 fixed on said plunger 59. The latter also has a lower fixed collar 75, Figure 14, positioned to be engaged by block 66 during said downward swing of arm 69. This moves said plunger 59 downwardly, thereby periodically retracting its upper end below the path of movement of the card in the sensing zone and moving its lower end to close a safety switch 76, Figures 6 and 18. Switch 76 however normally remains closed during card feeding operation of the machine and opens automatically to stop operation of the card feeding mechanism when the supply of cards to be sensed is exhausted. This can occur only on the upward swing of arm 69 which raises block 61 and therefore plunger 59. In the absence of a card in the passageway, said plunger is free to move upwardly and thus bring its upper end across the card path and into hole 57 and to raise its lower end into position to open switch 76 and stop the machine.

Arms 69, Figure 4, are actuated to swing their free ends downwardly, as above described, by a cross shaft 70 which is rotated periodically through a small angle by operation of a cam 79 on shaft 3. A cam follower 80 carried on one arm of a bell crank lever 81 pivoted at 82 is held yieldingly in riding contact with the periphery of said cam 79. The other arm of said lever is connected by a link 83 with a lever 84 secured midway on shaft 70 which also carries arm 69. Thus, when cam follower 80 is raised to the dotted line position by cam 79, Figure 4, the free end of arm 69 is deflected downwardly against resistance of spring 74. This withdraws the card stop 56 and the roller controlling plungers 61 to permit discharge of one card out of the sensing zone and admission of the next in its place.

Sensing circuit, shunts and connections

As shown in Figure 7, a typical record card D is provided with conventional markings which divide its surface into "fields," as S, M, R, suitably identified for the particular industry or other environment in which the cards are to be used. Each field is subdivided into vertical columns representing orders of digits, each column having a number marking, as at 85, and into horizontal rows, representing the digits 0–9. According to well known systems, informative data is recorded on cards, as D, by punching perforations 86 therein. It is one of the objects of this invention to utilize these perforations or one or more of them in conjunction with the devices above referred to and others to be described in such a manner that some, including a plurality of cards bearing different selection control perforation patterns, may be automatically separated from a stack of cards, moved to a sensing and circuit operating position, and discharged therefrom, during a single pass of a stack of said cards D through the sensing zone C.

For purposes of illustration, card D, Figure 7, has perforations in the R field which by their positions represent the registration number "134725," the respective digit postions thereof being in the vertical columns numbered "70–75" inclusive at the bottom margin of the card. As previously explained, the sensing mechanism includes a contact strip 41 for each of these columns; and as shown in Figures 6, 10, and 11, also a separately effective card controlled conducting contact in the sensing zone for each digit position presented by the card D. Thus, a card having eighty vertical columns, each with ten digit positions, presents eight hundred such positions. Accordingly, supporting bars 87 of insulating material, as Bakelite, are provided, each carrying a set of ten contact or sensing brushes 88 in the form of resilient metal strips, a brush being thus provided for each digit 0–9 inclusive, of a column, and a set of brushes being provided for each vertical column of the card D, or eighty sets for the card illustrated.

Card controlled contacts

For convenience in assembly the upper ends of sensing brushes 88 of each set of brushes carry plugs 89, Figure 10, which cooperate with sockets 90 at the ends of conductor wires or shunts 91, arranged in parallel and intermediate portions of which are held above the sensing chamber by a cross piece 92 when corresponding bars 87 with their respective sets of brushes 88, one to each shunt, are operatively positioned with their ends in the vertical slots 48 of walls 47 and resting on shoulders 49 at the bottom of said slots. If desired, a supplemental support, as bar 178, Figure 12, having ends adapted to engage slots 48, is inserted at each side of a bar or bars 87 to steady them in operative position in the sensing chamber. The lock rods 51 are slid in place after bars 87 have been positioned in said slots; and said rods hold said bars securely in position with the lower ends of each set of brushes 88 extending through a slot 45 and into position simultaneously to conductivity and yieldingly engage portions of the upper edge of a corresponding contact strip 41 during sensing operation. Although the set of ten sensing brushes 88 carried by each bar 87 are thus positioned to close contact between an adjacent conductor strip 41 and a shunt 91, only one of said sets of sensing brushes 88, Figure 15, will do so in sensing the card shown because, for purposes of card selection, only one digit position or space in a card column need be perforated.

Assuming that the card D, Figure 7, is one of a plurality to be separated from the stack and employed to actuate the circuit to some useful purpose, as to deliver said card into compartment B in one pass from a stack of cards, and that selection is made on the basis of different perforation patterns (registration numbers) in field R comprising six columns of digits, the operation will require in the sensing chamber six sets of brushes 88 corresponding to the six columns (numbered "70" to "75" inclusive) of digits in the R field. Any other or greater or less number of columns and sets of sensing brushes 88 and shunts 91 could be employed in a suitably modified machine depending on the number of orders or columns of digits in the registration or other field or fields used as a basis for selective perforation patterns.

Since in the illustrated example, the perforation pattern is determined by the six digit number "134725," when card D is in sensing position, that brush of one set of sensing brushes 88 of one set of shunts 91 representing digit "5" in the units column, will extend through the perforation 86 at the "5" position in column "75" of card D to engage a contact strip 41; another brush of another set representing the digit "2" in the tens column will simultaneously extend through the perforation 86 at the "2" position in the tens column of card D to engage the next contact strip 41; and similarly with respect to the remaining sets of brushes 88 and perforations representing digits of the other orders of the selective number under consideration. Thus, when card D is in sensing position the sensing brushes of the several sets operating simultaneously through the perforations 86 connect contact strips 41 with end portions of corresponding shunts and with portions of a sensing circuit which, when completed by means to be described, may be used to selectively actuate other devices. In the particular embodiment shown the energizing of the completed sensing circuit causes card D and/or other "wanted" cards to be selectively delivered into the B compartment whereas unwanted cards are delivered into compartment A.

Provision is made for imparting suitably timed vertical movement to the sensing box carrying the card engaging or sensing brushes 88, said box being moved downward to insure effective contact of the ends of said brushes with strips 41 during sensing, and upward to raise the ends of said brushes sufficiently to reduce or remove any drag thereof on the cards during card feeding. For this purpose said box is mounted to rest on springs 179 which normally tend to hold it high enough above upper plate 39 so that the ends of brushes 88 clear or only slightly obstruct the path of movement of the cards through the passageway between said upper plate 39 and lower plate 40. Suitable guide bolts 180 engage vertical sockets in brackets 181 at the four corners of the box to insure vertical movement. To move the box down against resistance of said springs 179 and thus bring the brush ends into position to operatively engage the contact strips 41 through the card perforations, a lever 182 having a bifurcated end is pivoted at 183 to the machine frame and with its bifurcated end engaging a pin 184 secured to card stop 56, Figure 16. The other end of lever 182 is connected by a link 185 to a stud 186 extending outwardly from each end of the box. Thus, when card stop 56 is moved upwardly to close the card path for sensing, the sensing box is moved downwardly against resistance of the springs 179; and when the card stop is retracted to permit card feeding, the box is moved upwardly by said springs.

*Card tripping or guiding mechanism*

As shown in full lines in Figure 4, a card trip 93 secured to a cross shaft journaled at 94 is mounted with its free end portion positioned just below the card exit from zone C. If a card emerges from zone C with trip 93 in this down position, the card passes over said trip and is delivered into reject compartment A. If, however, trip 93 is tilted to the dotted line position, a card emerging from zone C is intercepted thereby and deflected into compartment B. Ordinarily this tilting will be controlled by the sensing mechanism including a perforated card and employed to segregate the "wanted" cards in B since their number, for any given pass or run, is usually small in comparison to the whole number of cards handled.

To actuate trip 93 to card intercepting position, i. e. with its free end lifted above the path of movement of a card discharged from the sensing zone and in response to a perforation pattern on that card, the cross shaft journaled at 94 is rocked by an arm 95 which in turn is actuated from a solenoid having a coil 96 in the sensing circuit controlled in a manner to be described. The rocking armature arm 97 of said solenoid, pivoted at 98, is biased with its armature portion out of engagement with the core of said coil by a spring 99. An arm 100 with one end fixed to rocking armature arm 97 has its other or free end connected to the free end of arm 95 by a link 101. Thus, when coil 96 is energized, armature arm 97 is deflected to the dotted line position, Figure 4, thus rocking the shaft journaled at 94 to bring trip 93 into the intercepting position, indicated in dotted lines, Figure 4.

As seen in Figure 18, the sensing circuit includes the leads 102 and 103 having terminals secured to a plug board P at 104 and 105 respectively. Lead 103 also connects at one end with a brush 107 wiping one portion of the periphery of a commutator 108 which inclues an insulator segment 109 extending 180° thereof. By this arrangement the sensing circuit can be energized only over the half turn of commutator 108 which coincides with the period during which card D is in sensing position and is inert during the remaining operative period, or while the sensed card is being discharged and a new card fed into the sensing zone.

*Trip holding circuit*

It will be recalled that when the sensing circuit is initially closed, as when a selected card reaches sensing position and the perforation pattern thereof corresponds with pre-conditioned suitable circuit opening and closing devices, one embodiment being hereinafter described, coil 96 is energized, for example, to tilt said trip 93 into dotted line position, Figure 4. To hold it in this position so that the causative card can be delivered into compartment B, an auxiliary or holding circuit is established through a coil 110, Figure 18, which is energized simultaneously with coil 96. Said coil 110 closes a switch 111 connected by wire 112a with a brush 112. An insulator segment 113 extending over a shorter angle than segment 109 is arranged on the periphery of commutator 108 in the path of brush 112. A third brush 114 bears on a central portion of the peripheral surface of commutator 108 which is conductive through 360°. Thus, the auxiliary or holding circuit provided for coil 96 is energized to hold trip 93 in dotted line position sufficiently long after the sensing circuit is opened by discharge movement of the card to enable the card feeding devices to deliver the causative card into compartment B. Obviously, if any card in the sensing chamber does not present a perforation pattern through which the sensing circuit is closed to energize coil 96, the trip 93 remains down (full line position).

*Multiple card control of trip*

In addition to the sensing devices above described, my apparatus includes means, as suitable circuit opening and closing devices, whereby cards of different perforations patterns located in a stack of cards may be used to complete or close said sensing circuit during a single pass of said stack as and when said cards reach and are held in the sensing zone.

As indicated in Figure 18, the wires 43 connect contact strips or terminals 41 in the lower sensing plate with suitable terminals 43a in plug board P, six only being shown, although it is contemplated that in a completely selective embodiment as many contact strips and wire connections will be provided as there are columns on the cards, in the illustrated case, eighty.

One form of circuit opening and closing device for the purposes above indicated includes a suitable multiple switch carrier, as drums 115, 115a, 115b, etc., each provided with at least one set of switches for each set of sensing brushes 88, each set of shunts and each column of numbers or places for perforations on the cards. For practical purposes, the apparatus is complete when equipped with a number of such drums, or other carrier device, corresponding to the greatest number of card perforation columns actually to be employed or required for sensing and sorting or otherwise utilizing a given set of cards. For example, with card D, wherein six columns (R field) identified with number markings "70-75" are used, six drums, or other suitable carrier, will be sufficient.

For sorting or otherwise usefully employing these cards by reference to the R field, therefore, the six switch carriers or drums 115, 115a, etc., are rigidly mounted on and rotate with a shaft 116 journaled in the casing, Figure 1, at 117 and 118. Each such drum provides spppport for a plurality of angularly spaced sets of controllably conditionable circuit opening and closing devices, as switches 146, Figure 5, and a continuous conductive portion, on common pole, 136, Figure 1, arranged and utilized in a manner to be described. In the multiple drum arrangement shown, said sets of switches 146 are angularly spaced around each drum and arranged in transverse rows or groups of six sets each across said drums.

*Setting control switches*

Shaft 116 may be manually turned by means of a knob 119 for setting and clearing the switches 146. During normal multiple selection operation however, said shaft 116 is actuated from shaft 1 by a gear driven clutch including a hub 120 having at one end a shoulder yieldingly held in operative position to engage the shoulder 121 of a collar 122 fixed in shaft 116. For this purpose a spring 123 bears against an annular flange 131 at the outer end of said hub.

A clutch operating lever 124 pivoted at 125, Figure 2, has a bent shank extending through an L shaped key opening 126 in wall 127. An intermediate widened portion 128 of said shank is provided with a slot 129 embracing said hub 120 in the annular groove between said flange and gear 130 which is fixed to hub 120 and therewith freely rotatable and slidable on shaft 116.

Lever 124 also has an arm 132 which in the position of lever 124 shown in Figure 2, aligns with a portion of the key hole opening 126, thus permitting the outer end of lever 124 to be deflected to the left, as seen in Figure 1, sufficiently to bring arm 132 to the dotted line position. Lever 124 is then pulled down to bring arm 132 into engagement with a portion of wall 127 adjacent to slot 126, thus releasably locking said lever in deflected position to disengage the inner end of clutch hub 120 from shoulder 121 so that shaft 116 and the carriers or drums thereon may be freely rotated by hand for setting or other purposes to be described later. When the free end of lever 124 is returned to up position, arm 132 again comes into register with the aligned portion of key hole opening 126 whereupon said arm is moved by spring 123 through said opening to the full line or clutch engaging position, Figure 1, where it is locked by pulling down the free end of lever 124 to carry arm 132 out of register with opening 126.

In normal multiple selection operation, shaft 116 is driven through the clutch above described from shaft 1. A gear 133 thereon engages an idler 134 journaled at 135 and constantly meshing with clutch gear 130.

*Circuit control switches and operations thereof*

The gear ratios are such that during each cycle of operation, shaft 116 and the drums 115, 115a, etc., make two complete rotations to one single complete rotation of shaft 3 which, as previously described, actuates the card picker through levers 8, Figure 4; actuates the card stop and card feed roller engaging and disengaging devices in the sensing box through cam 79, Figure 4, and carries the commutator 108, Figures 1 and 18, which controls the sensing and trip holding circuits. By this arrangement the drums on shaft 116 make one complete sensing rotation while brush 107 in the sensing circuit rides on the 180° conductive portion of commutator 108 cooperating therewith; and a complete but non-functioning rotation when brush 107 engages the 180° insulating sector 109.

Referring now to Figures 1 and 18, each of the several (six shown) switch carrier drums 115, 115a, etc., has its peripherally exposed continuous pole or conductor portion 136 engaged by a brush or contact member 137 which is connected by a wire 138 to a terminal 138a mounted on plug board P in conductive relation to a corresponding terminal 43a of a wire 43, thus in effect forming a circuit connection between each drum and a contact strip or terminal 41.

*Sensing circuit and shunts therein*

As shown in Figures 1 and 18, each set of ten sensing brushes 88 is connected by ten wires or shunts 91 to a set of ten wiping brushes 146 positioned severally to wipe each set of ten separate insulated contacts on the periphery of one of the drums 115, 115a, 115b, etc., said wires and connections forming in effect a set of ten shunts arranged in parallel. For sensing a card D, therefore, on the basis of perforations in field R thereof, the six sets of shunts 91 and the intermediate conductors 43 and 138 are connected as shown in Figure 18 to provide the sensing circuit. In operation this circuit is closed through a shunt in each set of shunts when pre-selected closed switches on the drums 115, 115a, etc., are in position to simultaneously close at one end those shunts which are closed at their other ends through the perforations 86 in the particular card D then in sensing position. If, however, selection is based on any perforation occurring in a single column of field R, as the unit column for example, Figure 7, the sensing circuit is energized through the shunts and switches associated with the corresponding drum, as 115e, Figure 18. Accordingly, conductor 43 thereof is detached from its panel board connection as shown, and is connected directly to terminal 105 in place of the conductor 43 of drum 115 which, with the remaining drums 115a, 115b, 115c, and 115d, now remains out of the sensing circuit.

The arrangement above described in effect provides a sensing circuit comprising one set of shunts, or for sensing on more than one column, a plurality of sets connected in series, to close the circuit through one or more record perforations effective at one end of said shunts and through one or more selected or conditioned switches, one in a set on the carrier drum or drums 115, 115a, 115b, etc., effective at the other end of said shunts.

Details of one embodiment of structure for the purposes indicated are shown in Figures 3 and 5. For example, each switch carrier 115, 115a, etc., shown in Figure 3 is in the shape of a drum or hollow cylinder, the peripheral surface of which presents transverse rows of ten separate insulated contact plugs 144 each, alternating with rows of ten holes 145 each, representing the numerals 0–9. Within the drum and arranged transversely in sets of ten and operatively related to said plugs and holes are assemblies of switch plungers 146 electrically connected with the brushes or contact members 137 and each carried in a socket or recess of a separate block 147, ten such blocks being pivoted side by side on a transverse rod 148. A spring 149 in each of said sockets biases the plungers 146 radially outward so that their heads normally press yieldingly against the under side of insulating portions 150 of the peripheral wall of the drum, that is, in neutral or open circuit position. A cam 151 is secured to or forms part of block 147 and is positioned with its curved cam edge radially inward from and opposite a hole 145 in the periphery of the drum.

*Switch setting or keying-in devices*

These holes 145 are arranged to receive and cooperate with switch setting or conditioning devices including keys 153 having stems as plungers 152 of rectangular cross sectional contour having rounded inner ends. Each such plunger has at its outer end a key cap or finger piece bearing a numeral identification marking. Said keys are arranged in sets or rows of ten numbered "0–9", one set for each drum, Figure 9, and, therefore, for each column of digit spaces on the cards to be sensed being mounted on the top wall of the casing. Said wall is provided with holes of rectangular contour through which said plungers 152 extend inwardly toward the corresponding drum. A block 154 between the casing or top wall and the drum has similarly shaped guide holes opposite said first mentioned holes in the top wall, so that the plungers 152 are accurately supported and guided for vertical reciprocating movement. Each plunger has a stop flange or collar 155 engaged by one end of a spring 156 which biases the plunger upwardly and out of engagement with the holes 145 in the periphery of the drum.

Each of the several sets of ten keys 153 above described constitutes in effect a key board, the numbered keys of which are employed to actuate and thereby close on condition selected switches of those arranged in the several transverse rows or angularly spaced sets thereof mounted in the adjacent cooperating carrier or drum. With any such row or set of switches in position opposite the row of keys, a selected switch is conditioned, i. e. the plunger 146 is moved from neutral to circuit closing position by the rounded inner end of a plunger 152 engaging and deflecting a cam 151 when the corresponding key 153 is pressed down. Thus, to set up the number "134725" on a group of six aligned sets of switches carried by the several drums 115, 115a, 115b, etc., key "1" of the key board for drum 115, Figures 1 and 18, is pressed down to close the selected corresponding switch in one set on that drum; likewise key "3" of the key board for drum 115a; key "4" of the key board for drum 115b; key "7" of the key board for drum 115c; key "2" of the key board for drum 115d; and key "5" of the key board for drum 115e. As each thus engaged switch cam 151, and therefore its corresponding block 147, is rocked to the deflected position, Figure 5, the head of plunger 146 yields to pass a slight inwardly directed ridge, as 157, and then frictionally engages the under side of the adjacent conductor or contact plug 144, where it remains until re-set to initial neutral position by an arm 158 rigidly secured to a shaft 159 having its ends journaled in the side walls of the drum.

To facilitate the setting or keying-in of selected switches as above described, a cylindrical dial 164 is fixed to drum shaft 116 and bears numeral markings on its periphery, severally aligned with the aligned sets of switches extending transversely of the drums. These numeral markings are visible through an opening 165 in the casing, Figure 9.

A ratchet 166, Figures 2 and 3, is also secured to said shaft 116 conveniently through dial 164, and cooperates with a friction roller 167 to steady the shaft 116 and hence the drums mounted thereon at each switch setting or keying-in position thereof, forty being provided in the illustrated embodiment. Roller 167 is journaled at 168 on an arm 169 pivoted to bracket 170 and is held in yielding contact with the teeth of ratchet 166 while the drum switches are being set and the drums are rotated by hand from one setting position to another. For this purpose, one end of a plunger 171 is pivotally connected to an intermediate portion of arm 169, Figure 2, the other end having a knurled thumb piece 172. A spring 173, Figure 3, is arranged with one end bearing against a flange 174 forming part of a sleeve secured to plunger 171 by a cross pin 175. Normally, spring 173 biases plunger 171 downwardly and roller 167 into damping contact with the toothed periphery of ratchet 166. In this position of plunger 171, end portions of cross pin 175 rest on the bottom of guide slots 176 in a housing 177. After the required switches on the drums have been keyed in, shaft 116 will be released to turn freely by lifting plunger 171, thus raising roller 167 from damping or steadying engagement with ratchet 166 and into inert position where it will be held by said end portions of cross pin 175 resting on the upper edge of housing 177 when plunger 171 is rotated a quarter turn.

*Resetting switches to neutral after sorting*

One end of said shaft 159 extends beyond the drum, as to the right thereof, Figure 3, and carries a trip arm 160. A resetting key 161 has spring pressed plungers 162 one for each drum, extending through openings in the casing and in such position that the lower ends thereof, when the plungers 162 are depressed by hand to a position determined by collars 163, lie in the path of end portions of said trip arms 160. Thus, when the shaft 116 and therefore the drums 115, 115a, 115b, etc., are turned by hand counterclockwise, as viewed in Figure 2, and plungers 162 are pressed down as described, all trip arms 160 previously displaced, as by setting, ride across the end of plunger 162. This rocks them back to neutral position and thereby turns shaft 159 to swing arms 158 against the flat edge of cam 151, which returns all the plunger switches to initial neutral position.

*Operation*

As indicated in Figures 1 and 18, the sets of wiping brushes 140 are mounted with the brush ends riding on the peripheries of the several drums, each brush being aligned with a circumferentially extending series of mutually insulated contact plugs 144, the outer surfaces of which are exposed on the surface of the drum. Each such contact plug 144 cooperates with a given switch plunger 146 which, in turn, is coordinated both with the numbered setting keys 153 during setting, and with perforations 86, representing corresponding digits, in the several selected record cards during sensing to energize or transmit actuating effect to coil 96 for the purposes above explained.

In operating the herein described apparatus to sort cards D on the basis of perforations in the R field thereof, six contact bars 87 are mounted in the sensing box in the slots thereof numbered "70-75" inclusive, corresponding to the like numbered columns of said card; and necessary connections are made to complete the shunt circuits. If forty cards representing forty different registration numbers, for example, are required to be delivered into compartment B from a stack of such cards, the digits of each of said registration numbers are set up for sensing by depressing correspondingly numbered keys 153 thus setting or conditioning the corresponding switches in a transversely extending group of aligned sets of switches on the several drums 115, 115a, 115b, etc. The stack of cards is now placed in the hopper E and a main power switch 187, Figure 18, is closed. When start switch 188 is closed, solenoid coil 189 is energized to close switch 190 in the sensing circuit and to energize coils 191 and 192 to close switches 193 and 194 respectively in the circuit of motor 106.

This starts the card feeding operation previously described during which switch 76 normally remains closed, thus establishing the circuit through wire 195 and stop switch 196 which is also normally closed. Each card fed into the sensing zone remains motionless therein while the drums 115, 115a, 115b, etc., make a complete turn, thus successively presenting said forty differently conditioned transverse rows of plungers 146 in conductive relation to the contact ends of said wiping contacts 140 to close the sensing circuit through at least one of them. Whenever a card in the sensing position has perforations at places representing the digits corresponding to those set up or keyed in on any one of the forty transverse rows of said drum switches, the sensing circuit is completed in series through the connections previously described; and coil 96 is energized to actuate the card guiding trip 93, or for any other useful purpose. The other cards, of course, do not complete the circuit and are therefore delivered to compartment A in the embodiment shown.

In the example given above for illustration it has been explained how forty cards having different numbers represented by different perforation patterns are separated in one pass from a stack of cards. This operation involved "keying-in" or conditioning only a single switch in each set or transverse row of switches 144—146 on each of six drums 115, 115a, etc., each such "keyed-in" switch representing a digit in a number of six orders. The capacity of the machine in respect to the number of different cards capable of being separated is however not so limited. Indeed, the number of cards of different perforation patterns to be selected or separated from any given stack may be multiplied many fold, even by employing only one of the forty numbered (on dial 164) transverse rows of switches 144—146 extending across the several drums. For example, it is desired to employ only the row numbered "1" on the dial 164, Figure 1, to separate from a stack all of the cards numbered from 134720 to 134729 inclusive instead of the single card bearing number "134725" previously considered. In this case, said row of switches 144—146 numbered "1", after setting will be positioned by hand to engage the wiping brushes 140. Clutch 121 will remain disengaged and the drums will remain stationary while the card feeding and sensing operations proceed. This saves unnecessary wear on the brushes and contacts and/or permits the use of a stationary switch carrier in place of the drum shown.

For multiple selection, however, with a device as illustrated, the switches representing "tens" and higher are set as above; but for the "units," the operator depresses the set of ten keys 153 which closes the corresponding switches 144—146 in the number "1" set of switches on the "units" drum 115e, last to the right, Figure 18. With this arrangement all ten cards numbered as indicated will be separated from the stack in one pass. Likewise, if all of the switches 144—146 in set number "1" of the "tens" drum are also closed, the machine is now prepared to separate all cards having perforations representing the numbers from 134700 to 134799. It will be obvious that the selective capacity of the machine is almost indefinitely flexible.

From the foregoing description and mode of operation, it is apparent that my improved apparatus provides a sorter, selective controller or the like which is capable of selecting and segregating or otherwise beneficially employing a plurality of differently perforated record cards during a single pass of a large stack of such cards through the machine. Although I have illustrated an arrangement wherein the circuit is energized for a useful purpose through forty different cards in one pass, it will be apparent that this number may be almost indefinitely increased as, for example, by increasing the number of transverse rows of switches 144—146 on the drums and/or by closing or "keying-in" additional switches 144—146, representing corresponding additional digits, in one or more of the transverse rows or sets of said switches, and/or by increasing the number of columns for perforations and providing a like number of additional drums. Comparison of these possibilities with the limitations of presently known sorters and the like first above mentioned indicates that my improved apparatus is capable of multiplying many fold the usefulness of machines of this type.

Besides the physical segregation of cards which the above described embodiment is more particularly designed to effect, it will be apparent that other useful work can result from suitable adaptation of the card controlled sensing devices to different kinds of tabulating or other machinery or the like. In other words, instrumentalities combining card handling devices, the switch carrier, and the sensing mechanism including its cooperating electrical parts, broadly constitute means both for identifying the wanted cards and controlling their separation from the unwanted cards and for selectively energizing, through such cards, one or more circuits for any appropriate useful purpose.

I claim—

1. Card sorting apparatus of the type wherein cards having differently positioned perforations therein are separated singly in succession from a stack thereof, are moved from said stack to a sensing position, and are delivered from said sensing position some to one destination and others to another destination in accordance with control devices cooperating with perforations in said cards during sensing, said apparatus comprising means for advancing cards from the stack toward a destination, card guiding means having a portion movable into and out of the path of movement of the cards, means for actuating said card guiding means including a sensing and guide actuating circuit, means for controlling said circuit including a plurality of sets of parallel shunts, said sets being arranged in said circuit in series, each shunt having a brush, said brushes being positioned and adapted to cooperate with a card and with perforations therein when said card is in sensing position to connect said circuit with one of said shunts in each set thereof, shunt opening and closing means for each set of shunts movable into and out of operative relation to said circuit and said shunts, and means for moving said shunt opening and closing means into and out of operative position to open and close said circuit through a shunt in each set of shunts while one of said brushes in each set of brushes is in position to connect a shunt of each set of shunts with said circuit through perforations in the card.

2. Card sorting apparatus of the type wherein cards having differently positioned perforations therein are separated singly in succession from a stack thereof, are moved from said stack to a sensing position, and are delivered from said sensing position some to one destination and others to another destination in accordance with control devices cooperating with perforations in said cards during sensing, said apparatus comprising means for advancing cards from the stack, card guiding means having a portion movable into and out of the path of movement of the cards, means for actuating said card guiding means including a sensing and guide actuating circuit, means for controlling said circuit including a plurality of sets of parallel shunts, said sets being arranged in said circuit in series, each shunt having a brush, said brushes being positioned and adapted to cooperate with a card and with perforations therein when said card is in sensing position to connect said circuit with one of said shunts in each set thereof, a plurality of shunt opening and closing means for each set of shunts arranged and adapted to open and close different shunts of each said set of shunts and movable in succession into and out of operative relation to said circuit and said shunts, and means for moving said plurality of shunt opening and closing means into and out of operative position to open and close said circuit through a shunt in each set of shunts while one of said brushes in each set of brushes is in position to connect the circuit to said set through a perforation in said card.

3. Card sorting apparatus of the type wherein cards having differently positioned perforations therein are separated singly in succession from a stack thereof, are moved from said stack to a sensing position, and are delivered from said sensing position some to one destination and others to another destination in accordance with control devices cooperating with perforations in said cards during sensing, said apparatus comprising means for advancing cards from the stack toward a destination, card guiding means having a portion movable into and out of the path of movement of the cards, means for actuating said card guiding means including a sensing and guide actuating circuit, means for controlling said circuit including a set of parallel shunts each having a brush, said brushes being arranged and adapted to cooperate with a card and with a perforation therein when said card is in sensing position to connect said circuit with one of said shunts, shunt opening and closing means movable into and out of operative relation to said circuit and said shunts, means for moving said shunt opening and closing means into and out of operative position to open and close said circuit through a shunt while one of said brushes is in position to connect said shunt to the circuit through a perforation in said card, said shunt opening and closing means including a plurality of mutually insulated switches having portions conductively connected with said several shunts, and said means for moving the shunt opening and closing means including a rotatable carrier on which said switches are mounted, manually operative means for selectively closing said switches, and means for opening said switches.

4. Control apparatus employing perforated cards comprising a circuit including a plurality of sets of parallel shunts, said sets being arranged in said circuit in series, each shunt having a brush, said brushes being positioned and adapted to cooperate with perforations in a card when said card is in sensing position to connect said circuit with one of said shunts in each set thereof, shunt opening and closing means for each set of shunts movable into and out of operative relation to said circuit and said shunts, and means for moving said shunt opening and closing means into and out of operative position to open and close said circuit through a shunt in each set of shunts while one of said brushes in each set of brushes is in position to connect a shunt of each set of shunts with said circuit through perforations in the card.

5. Control apparatus employing perforated cards comprising a circuit including a plurality of sets of parallel shunts, said sets being arranged in said circuit in series, each shunt having a brush, said brushes being positioned and adapted to cooperate with perforations in a card when said card is in sensing position to connect said circuit with one of said shunts in each set thereof, a plurality of shunt opening and closing means for each set of shunts arranged and adapted to open and close different shunts of each said set of shunts and movable in succession into and out of operative relation to said circuit and said shunts, and means for moving said plurality of shunt opening and closing means into and out of operative position to open and close said circuit through a shunt in each set of shunts while one of said brushes in each set of brushes is in position to connect the circuit to said set through a perforation in said card.

6. Control apparatus employing perforated cards comprising a sensing circuit, means for controlling said circuit including a set of parallel shunts arranged and adapted to cooperate with a card and with a perforation therein when said card is in sensing position to connect said circuit with one of said shunts, shunt opening and closing means movable into and out of simultaneously operative relation to said circuit and said shunts, means for moving said shunt opening and closing means into and out of simultaneously operative position to open and close said circuit through a shunt while said shunt is connected to the circuit through a perforation in said card, said shunt opening and closing means including a plurality of mutually insulated switches having portions simultaneously conductively connectable with said several shunts, and said means for moving the shunt opening and closing means including a rotatable carrier on which said switches are mounted, manually operative means for selectively closing said switches, and means for opening said switches.

7. Sorting apparatus for perforated record cards comprising a sensing and card guide controlling circuit, a plurality of sets of parallel shunts, said sets being arranged in said circuit in series, each shunt having a brush, said brushes being positioned and adapted to cooperate with a card and with perforations therein when said card is in sensing position to connect said circuit with one of said shunts in each set thereof, shunt opening and closing means for each set of shunts movable into and out of operative relation to said circuit and said shunts, and means for moving said shunt opening and closing means into and out of operative position to simultaneously close and then open said circuit through a shunt in each set of shunts while one of said brushes in each set of brushes is in position to connect a shunt of each set of shunts with said circuit through perforations in the card.

8. Sorting apparatus for perforated record cards comprising a sensing and card guide controlling circuit, a plurality of sets of parallel shunts, said sets being arranged in said circuit in series, each shunt having a brush, said brushes being positioned and adapted to cooperate with a card and with perforations therein when said card is in sensing position to connect said circuit with one of said shunts in each set thereof, a plurality of shunt opening and closing means for each set of shunts arranged and adapted to open and close different shunts of each said set of shunts and movable in succession into and out of operative relation to said circuit and said shunts, and means for moving said plurality of shunt opening and closing means into and out of operative position to simultaneously close and then open said circuit through a shunt in each set of shunts while one of said brushes in each set of brushes is in position to connect the circuit to said set through a perforation in said card.

9. Sorting apparatus for perforated record cards comprising a sensing and card guide controlling circuit, a set of parallel shunts, each shunt having a brush, said brushes being arranged and adapted to cooperate with a card and with a perforation therein when said card is in sensing position to connect said circuit with one of said shunts, a plurality of sets of mutually insulated switches, the switches of each set having portions arranged for conductive connection with the shunts of a cooperatively related set of shunts, and said sets being movable in succession into and out of operative relation to said circuit and said shunts, and means for moving said plurality of sets of switches, one set after another, into and out of operative position to close and then open said circuit through a shunt while one of said brushes is in position to connect said shunt to the circuit through a perforation in said card.

10. Control apparatus for use with cards employing perforations at digit positions arranged in a column on said cards comprising a sensing circuit, a set of parallel shunts, one for each digit position in a column of digit positions, and having end portions arranged and adapted to simultaneously engage said digit positions of a card in sensing position to connect said circuit with one of said shunts through a perforation at one of said positions, a rotatable carrier, conductive means arranged on said carrier in a line parallel to the axis of rotation thereof and to other end portions of said shunts and movable with rotation of said carrier into and out of operative relation to said circuit and to said other end portions of said shunts, and means for rotating said carrier to move said conductive means into and out of operative position to close and then open said circuit through a shunt while said shunt is connected to the circuit through a perforation in said card.

11. Control apparatus for use with cards employing perforations at digit positions arranged in a column on said cards, comprising a sensing circuit, a set of parallel shunts, one for each digit position in a column of digit positions, and having end portions arranged and adapted to simultaneously engage said digit positions of a card in sensing position to connect said circuit with one of said shunts through a perforation at one of said positions, a rotatable carrier, conductive means arranged on said carrier in separate angularly spaced lines parallel to the axis of rotation of said carrier and to other end portions of said shunts, and movable with rotation of said carrier into and out of operative relation to said circuit and to said other end portions of said shunts, and means for rotating said carrier to move said lines of conductive means into and then out of operative position to close and then open said circuit through a shunt while said shunt is connected to the circuit through a perforation in said card.

12. Control apparatus for use with cards employing perforations at digit positions arranged in different fields on said cards comprising a sensing circuit, a plurality of sets of parallel shunts, one shunt for each digit position in a field thereof and one set of shunts for each said field, said shunts having end portions arranged and adapted to simultaneously engage said digit positions of a card in sensing position to connect said circuit with predetermined ones of said shunts through perforations at said digit positions, a rotatable carrier, conductive means aligned on said carrier to form sets, one set for each field, said sets being arranged parallel to the axis of rotation of the carrier and to other end portions of said shunts, and said sets being movable with rotation of said carrier into and out of operative relation to said circuits and said other end portions of said shunts, and means for rotating said carrier to move said sets of conductive means simultaneously into and out of operative position to close and then open said circuit in series through a shunt in each set of shunts while said shunts are connected to the to the circuit through a perforation in said card.

13. Control apparatus employing perforated cards comprising a sensing circuit, a set of parallel shunts arranged and adapted to cooperate with a card and with a perforation therein when said card is in sensing position to connect said circuit with one of said shunts, a plurality of sets of mutually insulated switches, the switches of each set having portions conductively connectable simultaneously with the shunts of said set of parallel shunts, said sets of switches being arranged and adapted to open and close different shunts and being movable one set after another into and out of operative relation to said circuit and said set of shunts, and means for moving said sets of switches one set after another into and out of operative position to close and then open said circuit through a shunt while said shunt is connected to the circuit through a perforation in said card.

14. Control apparatus for use with cards employing perforations at digit positions arranged in a column on said cards, comprising a sensing circuit, a set of parallel shunts, one for each digit position in a column of digit positions, and having end portions arranged and adapted to simultaneously engage said digit positions of a card in sensing position to connect said circuit with one of said shunts through a perforation at one of said digit positions, a rotatable carrier, conductive means arranged on said carrier in a line parallel to the axis of rotation thereof and to other end portions of said shunts and movable with rotation of said carrier into and out of operative relation to said circuit and to said other end portions of said shunts, means for separately conditioning said conductive means for circuit closing operations, and means for rotating said carrier to move said conductive means into and out of operative position to close and then open said circuit through a shunt while said shunt is connected to the circuit through a perforation in said card.

15. Control apparatus for use with cards employing perforations at digit positions arranged in a column on said cards, comprising a sensing circuit, a set of parallel shunts, one for each digit position in a column of digit positions, and having end portions arranged and adapted to simultaneously engage said digit positions of a card in sensing position to connect said circuit with one of said shunts through a perforation at one of said digit positions, a rotatable carrier, conductive means arranged on said carrier in separate angularly spaced lines parallel to the axis of rotation of said carrier and to other end portions of said shunts, and movable with rotation of said carrier into and out of operative relation to said circuit and to said other end portions of said shunts, means for conditioning said conductive means for circuit closing operations, and means for rotating said carrier to move said line of conductive means into and then out of operative position to close and then open said circuit through a shunt while said shunt is connected to the circuit through a perforation in said card.

16. Apparatus for sorting record cards having columns of record indicia comprising a movable card guide, means for actuating said guide, a set of card sensing instrumentalities arranged for cooperation with said cards to sense all indicia of a column, a movable carrier, a plurality of sets of conditionable transmitting devices carried thereby and arranged and adapted for transmitting an actuating effect through said card sensing instrumentalities to said guide actuating means, each set of said transmitting devices being adapted to compare an operative setting effected by selective pre-conditioning thereof with a record pattern on a card, and each set of said transmitting devices being operatively interrelated with and adapted to establish operative controlling connection between said cards and said card sensing instrumentalities independently of any other set of transmitting devices, and means for moving said carrier to bring one set after another of said plurality of sets of transmitting devices into and out of operative relation to said sensing instrumentalities during a sensing operation for effecting said comparison, said sets of transmitting devices being so arranged that all the transmitting devices of each of said sets thereof are brought simultaneously into and simultaneously out of said operative relation to said set of card sensing instrumentalities.

17. Control apparatus for use with record cards having columns of record indicia comprising a sensing circuit, means for energizing said circuit including a set of card sensing instrumentalities arranged for cooperation with said cards to sense all indicia of a column, a movable carrier, a plurality of sets of conditionable transmitting devices carried thereby and arranged and adapted for transmitting an energizing effect through said card sensing instrumentalities to said sensing circuit, each set of said transmitting devices being adapted to compare an operative setting effected by selective conditioning thereof with a record pattern on a card, and each set of said transmitting devices being operatively interrelated with and adapted to establish operative controlling connection between said cards and said card sensing instrumentalities independently of any other set of transmitting devices, and means for moving said carrier to bring one set after another of said plurality of sets of transmitting devices into and out of operative relation to said sensing instrumentalities during a sensing operation for effecting said comparison, said sets of transmitting devices being so arranged that all the transmitting devices of each of said sets thereof are brought simultaneously into and simultaneously out of said operative relation to said set of card sensing instrumentalities.

18. Control apparatus employing cards having columns of spaced portions for record indications; and comprising a circuit which includes a set of parallel shunts, each shunt thereof having a sensing brush and said brushes being arranged and adapted to cooperate simultaneously as a set with all of said spaced portions in a column of a card when said card is at rest in sensing position and to connect one of said shunts into said circuit through a record indication at one of said spaced portions of said card, a movable carrier, a plurality of sets of shunt opening and closing devices carried thereby and arranged and adapted for energizing said circuit through said shunts, each set of said shunt opening and closing devices being adapted to compare a shunt affecting condition presented thereby with a pattern presented by said card record indications, and each set of said shunt opening and closing devices being operatively interrelated with and adapted to establish operative controlling connection between said cards and said shunts independently of any other of said sets of shunt opening and closing devices, and means for moving said carrier to bring one set after another of said plurality of sets of shunt opening and closing devices into and out of operative relation to said shunts during a sensing operation for effecting said comparison, said sets of shunt opening and closing devices being so arranged that all said devices of each set thereof are brought simultaneously into and simultaneously out of said comparison effecting relation to said shunts.

19. In control apparatus employing record cards wherein record indicia, appearing in columns of spaces thereon with each column representing the digits 0-9, present a record pattern, the combination of a sensing circuit, a plurality of series connected sets of shunts in said circuit, one set for each said digit column, said sets of shunts being arranged for the simultaneous cooperation of each shunt thereof with a digit space of said respective columns, a movable carrier, a plurality of sets of conditionable switches carried thereby and operatively interrelated with and adapted to establish operative circuit controlling connection through said record indicia and said sets of shunts for energizing said circuit, said sets of switches being arranged on said carrier for simultaneous operative connection of all the switches thereof with the respective shunts of said several series connected sets of shunts to simultaneously compare different operative settings of switches in said sets thereof effected by selective preconditioning of a switch in each said set, with a record pattern involving indicia located in a plurality of digit columns on the card, and means for moving said carrier to bring said sets of switches simultaneously into and simultaneously out of said operative connection with said sets of shunts to effect said comparison.

BYRON R. HENDERSON.

CERTIFICATE OF CORRECTION.

Patent No. 2,328,340.　　　　　　　　　　　　　　　August 31, 1943.

BYRON R. HENDERSON.

It is hereby certified that error appears in the printed specification of the above numbered patent requiring correction as follows: Page 4, first column, line 70, for "conductivity" read --conductively--; page 5, second column, line 59, for "sppport" read --support--; line 63, and page 7, first column, line 18, for "on" read --or--; and that the said Letters Patent should be read with this correction therein that the same may conform to the record of the case in the Patent Office.

Signed and sealed this 19th day of October, A. D. 1943.

Henry Van Arsdale,
(Seal)　　　　　　　　　　　　　　　Acting Commissioner of Patents.